UNITED STATES PATENT OFFICE.

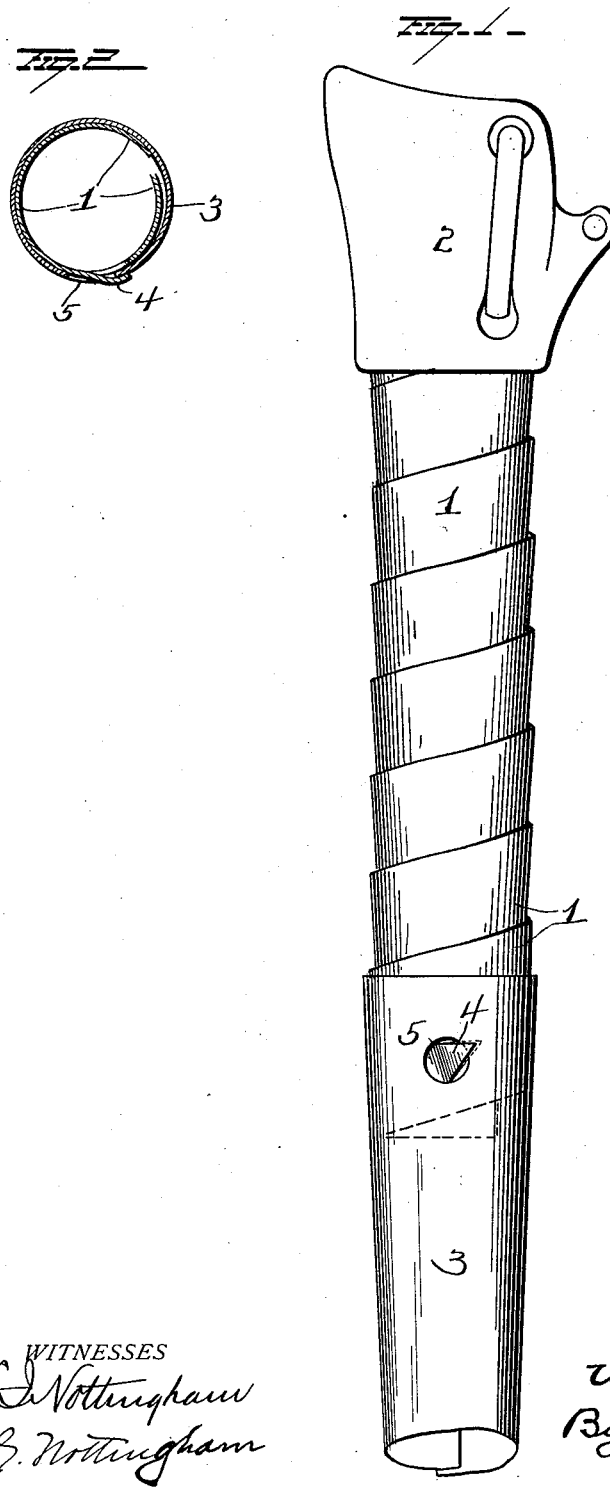

WILLARD A. VAN BRUNT, OF HORICON, WISCONSIN.

GRAIN-TUBE FOR SEEDING-MACHINES.

1,013,338.  Specification of Letters Patent.  Patented Jan. 2, 1912.

Application filed August 10, 1910. Serial No. 576,500.

*To all whom it may concern:*

Be it known that I, WILLARD A. VAN BRUNT, of Horicon, in the county of Dodge and State of Wisconsin, have invented certain new and useful Improvements in Grain-Tubes for Seeding-Machines; and I do hereby declare the following to be a full, clear, and exact description of the invention, such as will enable others skilled in the art to which it appertains to make and use the same.

This invention relates to improvements in grain tubes for seeding machines, the object of the invention being to so construct such a tube as to reduce its lower end to the smallest possible outside diameter and yet retain an inside diameter or bore which shall be ample to permit the free passage of grain and to so construct such lower portion of the tube as to effectually prevent the passage thereinto of dirt and furthermore to construct the tube in such manner that it shall have adequate flexibility as a whole.

A further object is to so construct a grain tube that its upper portion shall be flexible and its lower portion rigid and durable.

With these objects in view, the invention consists in certain novel features of construction and combinations of parts as hereinafter set forth and pointed out in the claim.

In the accompanying drawings, Figure 1 is a view of a grain tube showing an embodiment of my invention, and Fig. 2 is a detail view showing the manner of securing the rigid portion of the tube to the flexible portion thereof.

My improved tube comprises an upper flexible portion 1 provided at its upper end with a grain receiver 2, and a lower rigid member 3. The upper flexible member 1 may consist of spirally wound metallic ribbon and the rigid member 3 consists of steel tubing which tapers gradually from its connection with the upper flexible member to its lower end.

In effecting a secure connection between the upper end of the rigid member 3 and the lower portion of the flexible member 1 of the tube, I provide the lower convolution of the upper flexible member with a lug or tooth 4 which is sprung outwardly and caused to pass through a hole 5 in the rigid member 3 and engage the latter and thus the fastening means are retained against displacement by the torsional spring action of the flexible tube.

Having fully described my invention what I claim as new and desire to secure by Letters-Patent is,—

In a grain tube, a flexible tube and a lower rigid tapering tube which receives the lower end of the flexible tube, means for fastening the two parts together, such fastening means being retained against displacement by the torsional spring action of the flexible tube, substantially as set forth.

In testimony whereof, I have signed this specification in the presence of two subscribing witnesses.

WILLARD A. VAN BRUNT.

Witnesses:
F. H. CLAUSEN,
H. MARSH.

Copies of this patent may be obtained for five cents each, by addressing the "Commissioner of Patents, Washington, D. C."